Patented Dec. 20, 1949

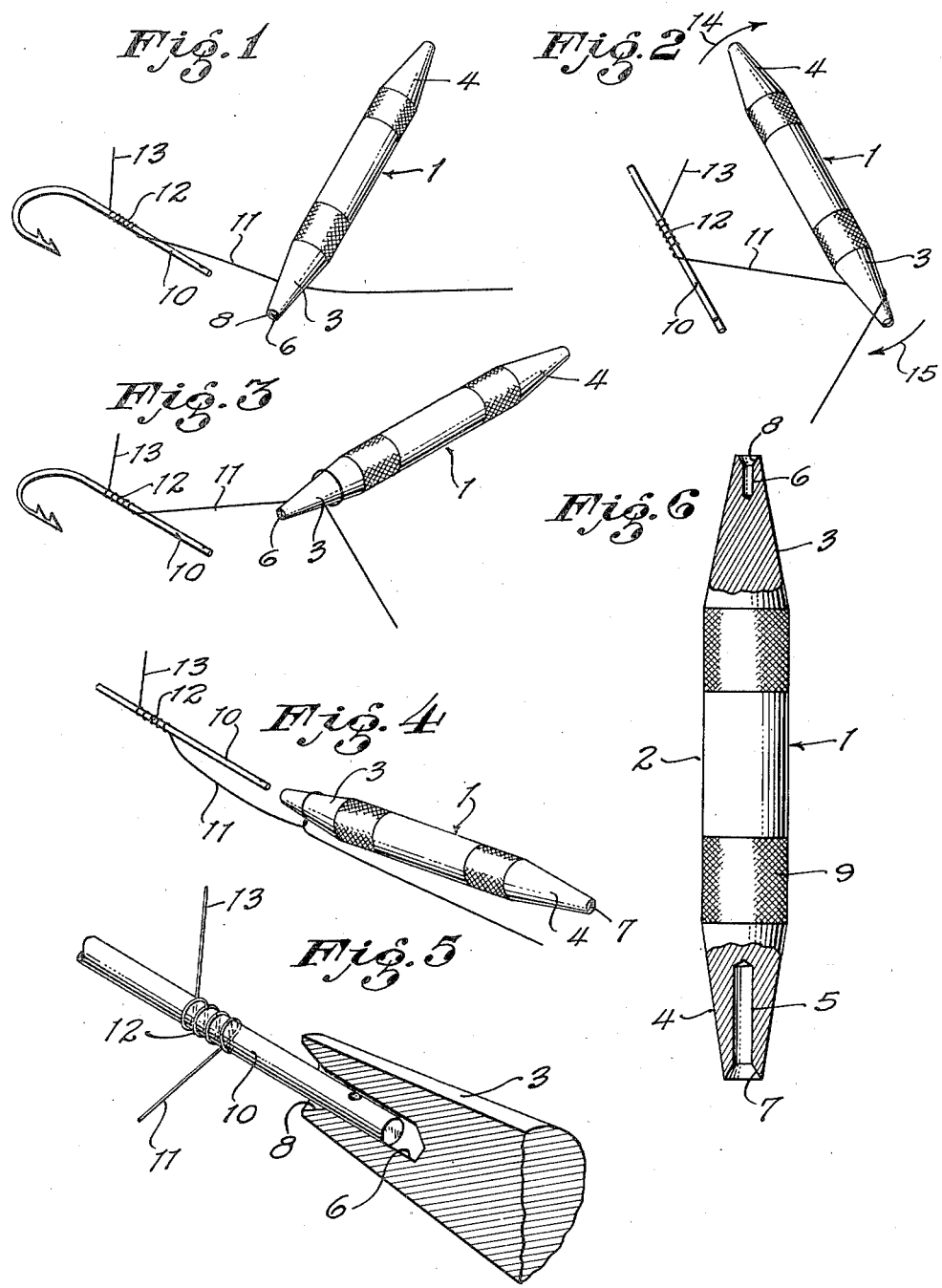

2,491,702

UNITED STATES PATENT OFFICE 2,491,702

FLY-TYING FINISHER

Ivan W. Arnold, North Hollywood, Calif.

Application October 21, 1947, Serial No. 781,059

2 Claims. (Cl. 289—17)

The present invention relates to finishers generally of the type which are utilized for tying a half hitch in a thread. It is general practice to wrap the shank of a fish hook and adjacent the hook end or barb, with a fly of some form. This fly is formed by wrapping thread about the shank of the hook and at the same time securing small bits of feathers, thus forming the resultant fly. During the fly forming operation various instrumentalities may be utilized for the wrapping of thread about the feathers such as a bobbin which progressively feeds the thread.

The present invention is adapted to act as a finisher in that after forming the fly, or during the forming thereof, it will be necessary to tie a half hitch in the thread. Generally a half hitch is formed at the beginning of the tying operation and must always follow in order to complete the fly. The present invention will form a half hitch at any point desired whether it be at the beginning of the tying operation or at its completion.

The invention has for an object the provision of a finisher which may be easily used by the most inexperienced operator to achieve a superior result.

A further object is the provision of a fly tying finisher which permits a half hitch to be made in thread at any point on the fly.

A further object is the provision of a fly tying finisher which is attractive in appearance, easily handled and capable of attaining superior results.

In the drawing:

Fig. 1 is a perspective view of a fish hook shown wrapped with thread and the fly finisher in the act of engaging the thread for the purpose of making a half hitch;

Fig. 2 is a fragmentary perspective view illustrating the operation of the device and the manner of engaging the thread;

Fig. 3 is a continuation of movement of the finisher with relation to the thread and fish hook;

Fig. 4 is a fragmentary perspective view showing the position of the finisher in the act of passing the looped thread onto the shank of the fish hook;

Fig. 5 is a fragmentary view partly in section showing the finisher engaging the shank of the fish hook, the half hitch being made on the shank; and Fig. 6 is an elevation partly in section of the fly tying finisher.

Referring now with particularity to the drawing and specifically to Fig. 6, the improved fly tying finisher is designated as an entirety by 1 and the same includes an elongated body 2, having conical or tapered ends 3 and 4 of extended length, the tapered ends being longitudinally bored as indicated at 5 and 6, the bore 5 being of greater diameter than the bore 6, with the bores varying as to length. Each bore has a flared end or mouth as shown at 7 and 8. This flare allows easy entrance within the uniform diameter portion of each bore. The body of the finisher may be knurled as shown at 9 so that the device may be readily gripped. I have found that a 5° taper for the ends 3 and 4 performs satisfactorily, and allows a half hitch of the thread to be made and readily moved from the conical end and onto the shank of the hook.

The operation, uses and advantages of the invention are as follows:

I assume that the operator is in the act of forming a fly on the shank 10 of a fish hook. As a rule, a fly tying bobbin is utilized which progressively feeds thread 11 from an end of such a device so that the operator may wrap the threads about the shank in the form of coils as shown at 12. Usually the innermost thread end at 13 is looped about the shank so as to hold the same. This may be accomplished through the medium of the finisher of the invention or a simple knot may be tied in the ordinary manner. Pieces of feathers of various colors to simulate a fly are secured by the loops of thread. After a certain number of the feathers have been wrapped, a loop or half hitch may be made in the thread so that the thread is secured.

To provide a half hitch or a loop and utilizing one end of the device, for instance the conical end 3 having the small bore 6, the thread is held either by a bobbin or by one hand with the thread engaging the conical surface 3 as shown in Fig. 1 whereupon the operator bodily turns the finisher and passes the thread around the conical end as illustrated in Fig. 2. The finisher is then moved in the direction of the arrows at 14 and 15, which brings the finisher into the position shown in Fig. 3, the thread being looped or given a half hitch on the conical tip. Following this, the finisher is moved toward the shank end of the hook as illustrated in Fig. 4, the shank being received within the bore 6, as for instance illustrated in Fig. 5, and the loop moved from the conical tip onto the shank adjacent the coils 12. As shown in Fig. 5, the thread is tied by this operation.

If the operator desires to tie the thread at any other portion of the coils, the opposite end of the finisher may be utilized as the bore 5 is of greater longitudinal length. As the bore 5 is of greater diameter than the bore 6, the device readily moves over the coils of thread which have already been formed on the shank and allows a half hitch to be provided at the very commencement of the coils.

In this manner a half hitch may be made at any point desired, a feature of importance in the practice of the invention.

The flared mouths 7 and 8 permit ready entrance of a hook shank within a bore.

I claim:

1. A fly tying finisher including a cylindrical body provided with a tapered end and formed with a longitudinal unobstructed uniform diameter bore extending part way through said tapered end.

2. A fly tying finisher including an elongated body provided with a tapered end, said tapered end formed with a flared mouth and an unobstructed uniform diameter axial bore extending into said tapered end and communicating with the flared mouth.

IVAN W. ARNOLD.

REFERENCES CITED

The following references are of record in the file of this patent:

UNITED STATES PATENTS

| Number | Name | Date |
|---|---|---|
| 1,518,961 | Burns | Dec. 9, 1924 |
| 1,729,240 | Augenstein | Sept. 24, 1929 |
| 2,109,604 | Van Norsdall | Mar. 1, 1938 |